United States Patent [19]

Ueki et al.

[11] Patent Number: 4,949,597
[45] Date of Patent: Aug. 21, 1990

[54] HYDRAULIC SYSTEM FOR CONTROLLING SHIFT IN AUTOMATIC TRANSMISSION

[75] Inventors: Akihiro Ueki, Zama; Kazuhiko Sugano, Yokohama, both of Japan

[73] Assignee: Nissan Motor Co., Ltd., Yokohama, Japan

[21] Appl. No.: 264,715

[22] Filed: Oct. 31, 1988

[30] Foreign Application Priority Data

Oct. 30, 1987 [JP] Japan .................. 62-273220

[51] Int. Cl.⁵ .............................. B60K 41/10
[52] U.S. Cl. ........................................ 74/869
[58] Field of Search ............. 74/752 C, 869, 878

[56] References Cited

U.S. PATENT DOCUMENTS

| | | | |
|---|---|---|---|
| 4,050,332 | 9/1977 | Taga ........................... | 74/869 |
| 4,555,964 | 12/1985 | Sugano ....................... | 74/869 |
| 4,637,281 | 1/1987 | Vanselous ................... | 74/869 |
| 4,727,774 | 3/1988 | Sumiya et al. .............. | 74/869 X |
| 4,730,521 | 3/1988 | Hayasaki et al. ........... | 74/867 |
| 4,787,258 | 11/1988 | Yamamoto et al. ......... | 74/869 X |

*Primary Examiner*—Dwight Diehl
*Assistant Examiner*—Harold F. Macris
*Attorney, Agent, or Firm*—Foley & Lardner, Schwartz, Jeffery, Schwaab, Mack, Blumenthal & Evans

[57] ABSTRACT

A single sequence valve is connected to a 3-4 shift valve thereby defining a drain circuit. The sequence valve is responsive to hydraulic pressures which act on a fourth speed apply chamber of a band brake and a high clutch, respectively. The sequence valve normally defines the drain circuit, but delivers hydraulic fluid to the 3-4 shift valve, then to the fourth speed apply chamber of the band brake after a command for a 4-2 downshift has taken place until the hydraulic pressure in the high clutch drops to a predetermined value.

9 Claims, 4 Drawing Sheets

FIG. 3

| | | R/C | H/C | F/C | O/C | B/B 2A | B/B 3R | B/B 4A | L&R/B | F/O | L/O | GEAR RATIO | α1 = 0.45, α2 = 0.45 |
|---|---|---|---|---|---|---|---|---|---|---|---|---|---|
| D RANGE | ENGINE DRIVING 1ST | ○ | | ○ | | | | | | ○ | ○ | $\dfrac{1+\alpha_1}{\alpha_1}$ | 3.22 |
| | 2ND | | | ○ | | | ○ | | | ○ | | $\dfrac{\alpha_1+\alpha_2+\alpha_1\alpha_2}{\alpha_1(1+\alpha_2)}$ | 1.69 |
| | 3RD | | ○ | ○ | | | | | | ○ | | 1 | 1 |
| | 4TH | | ○ | (○) | | | | ○ | | | | $\dfrac{1}{1+\alpha_2}$ | 0.69 |
| | ENGINE BRAKING 1ST | | | (○) | ○ | ○ | ○ | | | | | | |
| | 2ND | | | (○) | ○ | | ○ | | | | | | |
| | 3RD | | ○ | (○) | ○ | | | | | | | | |
| | 4TH | | ○ | (○) | | | | ○ | | | | | |
| 2ND RANGE | 1ST | | | ○ | | ○ | ○ | | | ○ | | | |
| | 2ND | | | ○ | | | ○ | | | ○ | | | |
| 1ST RANGE | 1ST | | | ○ | | | | | ○ | ○ | | | |
| REVERSE | | ○ | | | | | | | ○ | | (○) | $-\dfrac{1}{\alpha_2}$ | -2.22 |

( ) UNRELATED TO POWER TRANSMISSION

HYDRAULIC SYSTEM FOR CONTROLLING SHIFT IN AUTOMATIC TRANSMISSION

BACKGROUND OF THE PRESENT INVENTION

The present invention relates to a hydraulic system for controlling a shift in an automatic transmission.

JP 62-62047 discloses an automatic transmission including a band brake which is engaged in the second and fourth speed ratios, but released in the third speed ratio, and a high clutch which is released in the second speed ratio, but engaged in the third and fourth speed ratios. If a downshift from the fourth speed ratio to the second speed ratio is effected with the third speed ratio being established momentarily, a shock takes place twice, causing unplesant shift feel. In order to prevent the downshift as above from taking place, the known automatic transmission uses two valves, namely a 4-2 relay valve and a 4-2 sequence valve, so as to cause a direct downshift from the fourth speed ratio to the second speed ratio. The 4-2 relay valve delivers a boost pressure when a fourth speed apply chamber of the band brake is pressurized. This boost pressure is supplied via a 2-3 shift valve to the 4-2 sequence valve. The 4-2 sequence valve keeps on delivering the boost pressure until a hydraulic pressure in a third speed release chamber of the band brake drops to a sufficiently low level so as to allow engagement of the brand brake only by a hydraulic pressure acting in a second speed apply chamber. The boost pressure delivered by the 4-2 sequence valve is supplied to a 3-4 shift valve which in turn delivers this boost pressure to the fourth speed apply chamber to keep the band brake engaged when it is in a down position thereof. Thus, the fourth speed ratio is maintained until the band brake is ready to be engaged by the hydraulic pressure in the second apply chamber.

An object of the present invention is to provide a hydraulic system wherein the same function as mentioned above is performed by a reduced number of valves.

SUMMARY OF THE INVENTION

According to the present invention, the above-mentioned hydraulic pressure signals acting on the relay and sequence valves, respectively, act on a single sequence valve, whereby a relay valve for delivering a boost pressure is not needed any more.

According to the present invention, an automatic transmission includes; a first frictional device, a second frictional device having a predetermined chamber, first shift valve means having a first hydraulic line and a second hydraulic line connected to said first frictional device for supplying hydraulic fluid to said first hydraulic line and said second hydraulic line selectively, second shift valve means having a third hydraulic line connected to said predetermined chamber of said second frictional device for selectively supplying hydraulic fluid to said predetermined chamber, sequence valve means having a fourth hydraulic line connected to said second shift valve means for draining said fourth hydraulic line, said sequence valve means including spool means responsive to hydraulic pressure in said second hydraulic line and hydraulic pressure in said third hydraulic line for connecting said fourth hydraulic line to said first hydraulic line until the hydraulic pressure in said second hydraulic line drops to a predetermined value.

In one form of the present invention, there is provided an automatic transmission including; a first frictional device which is subject to hydraulic pressure build-up in a n+1th speed ratio and a n+2th speed ratio, where n is an integer, a second frictional device having a predetermined chamber which is not subject to hydraulic pressure build-up in a nth speed ratio and the n+1th speed ratio, but subject to hydraulic pressure build-up in the n+2th speed ratio, the first shift valve for controlling a shift between the nth speed ratio and the n+1th speed ratio, the first shift valve having a first hydraulic line and a second hydraulic line connected to the first frictional device, a second shift valve for controlling a shift between the n+1th speed ratio and n+2th speed ratio, the second shift valve having a third hydraulic line connected to the predetermined chamber of the second frictional device, a sequence valve having a fourth hydraulic line, the first shift valve discharging hydraulic fluid from the second hydraulic line and supplying hydraulic fluid under line pressure to the first hydraulic line when it is in a down position thereof, the first shift valve supplying hydraulic fluid under line pressure to the second hydraulic line and discharging hydraulic fluid from the first hydraulic line when it is in an up position thereof, the second shift valve allowing communication of the third hydraulic line with the fourth hydraulic line when it is in a down position thereof, the second shift valve supplying hydraulic fluid under line pressure to the third hydraulic line when it is in an up position, the sequence valve having a spool which is movable between a first position where said spool blocks the first hydraulic line and draining said fourth hydraulic line, and a second position where the spool allows fluid communication of said first hydraulic line with said forth hydraulic line, means for biasing the spool of the sequence valve toward the first position thereof, the spool of the sequence valve being urged toward said the position thereof by hydraulic pressures in the second hydraulic line and in the third hydraulic line, the spool of the sequence valve taking said second position thereof until the hydraulic pressure in the second hydraulic line drops to a predetermined value when the hydraulic pressure stays in the third hydraulic line.

BRIEF DESCRIPTION OF THE DRAWINGS

FIG. 3 is a table showing a shift schedule of the automatic transmission; and

DETAILED DESCRIPTION OF THE INVENTION

Figure 2:
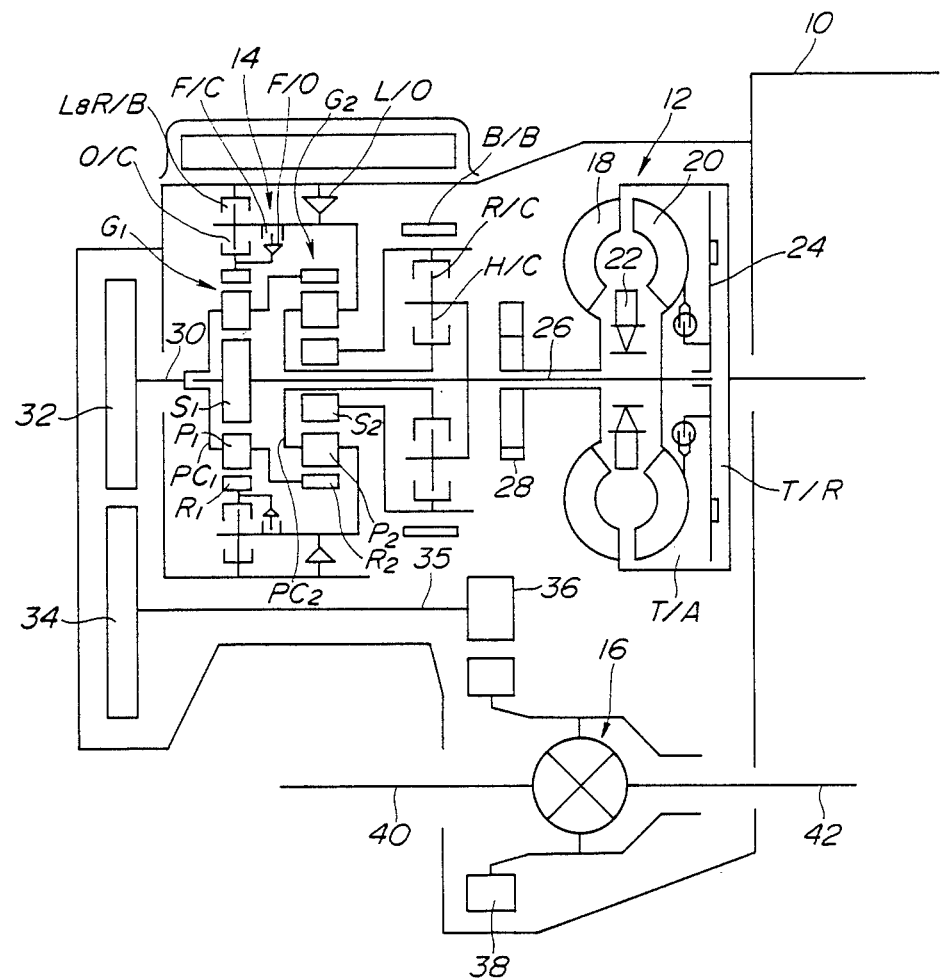
FIG. 2 is a diagram line of a power train of a transaxle including the automatic transmission.

Referring to FIG. 2, there is shown a diagram line of an automatic transmission (automatic transaxle). That is, the reference numeral 10 designates an engine which is suitable for transverse mounting with regard to the longitudinal direction of a vehicle. Torque of the engine is supplied to a torque converter 12 on a pump impeller 18 thereof. In addition to the torque converter 12, the automatic transmission comprises a change speed planetary gear box 14, and a differential unit 16. In addition to the pump impeller 18, the torque converter 12 includes a turbine runner 20 and a stator 22. It also includes a lock-up clutch 24 for establishing a mechanical drive connection between the pump impeller 18 and turnine runner 20. When the lock-up clutch 24 is disengaged or released, torque is transmitted via hydraulic fluid from the pump impeller 18 to the turbine runner 20 and then to a transmission input shaft 26 drivingly connected to the turbine runner 20. When the lock-up clutch 24 is engaged, the torque is transmitted via a mechanical connection between the pump impeller 18 and turbine runner 20 to the input shaft 26. The lock-up clutch 24 is activated in response to a pressure differential between an apply chamber T/A and a release chamber T/R. The pump impeller 18 is drivingly connected to an oil pump 28 so that the engine drives the oil pump 28.

The change speed planetary gear box 14 comprises a first planetary gear set $G_1$ and a second planetary gear set $G_2$. The first planetary gear set $G_1$ includes a first sun gear $S_1$, a first internal or ring gear $R_1$, and a first planet pinion carrier $PC_1$. The first planet pinion carrier $PC_1$ rotatably supports at least one planet pinion $P_1$ meshing with the sun and ring gears $S_1$ and $R_1$. The second planetary gear set $G_2$ comprises a second sun gear $S_2$, a second internal or ring gear $R_2$, and a second planet pinion carrier $PC_2$. The second planet pinion carrier $PC_2$ rotatably supports at least one planet pinion $P_2$ meshing with the second sun and ring gears $S_2$ and $R_2$. The first sun gear $S_1$ is drivingly connected to the input shaft 26, while the first pinion carrier $PC_1$ and second ring gear $R_2$ are drivingly connected to a transmission output shaft 30.

Via a serially connected forward one-way clutch F/O and forward clutch F/C, the first ring gear $R_1$ is drivingly connectable to the second pinion carrier $PC_2$. An overrun clutch O/C is arranged in parallel to the serially connected forward one-way clutch F/O and forward clutch F/C. Via this overrun clutch O/C, the first ring gear $R_1$ is drivingly connectable to the second pinion carrier $PC_2$. The second sun gear $S_2$ is drivingly connectable via a reverse clutch R/C to the input shaft 26. The second pinion carrier $PC_2$ is drivingly connectable via a high clutch H/C to the input shaft 26. The second sun gear $S_2$ is adapted to be held stationary relative to a transmission casing via a band brake B/B. The second pinion carrier $PC_2$ is adapted to be held stationary relative to the casing via a low one-way clutch L/O or a low & reverse brake L&R/B which is arranged in parallel to the low one-way clutch L/O. The output shaft 30 has an output gear 32 rotatable therewith. An idler shaft 35 is rotatably mounted in the transmission casing and extends in parallel to the output shaft 30. An idler gear 34 is connected to the idler shaft 35 for rotation therewith at one end portion thereof. At the opposite end portion, the idler shaft 35 has a reduction gear 36 for rotation therewith. The idler gear 34 is in mesh with the output gear 32, while the reduction gear 36 is in mesh with a ring gear 38 of the differential unit 16. The differential unit 16 has drive axles 40 and 42 extending outward in the opposite directions. These drive axles 40 and 42 are drivingly connected to a left front wheel and a right front wheel, respectively.

In the change speed planetary gear box 14, varying a selected one or a selected combination of the clutches F/C, H/C, O/C, and R/C, the brakes B/B and L&R/B, and the one-way clutches F/O and L/O which are to be activated or engaged will cause a shift in rotating state of planetary gear elements $S_1$, $S_2$, $R_1$, $R_2$, $PC_1$, and $PC_2$ of the planetary gear sets $G_1$ and $G_2$, causing a change in the rotational speed of the output shaft 30 relative to the rotational speed of the input shaft 26. More specifically, activating one of or a combination the clutches, brakes, and one-way clutches in a schedule as illustrated in the TABLE in FIG. 3 will cause a shift between four forward speed ratios in various modes and a reverse speed ratio. In FIG. 3, the sign o indicates that a particular frictional device is activated or engaged. If the particular friction device is a clutch or a brake, the above-mentioned sign o indicates the engagement of the clutch or brake, while if the particular friction device is a one-way clutch, the sign o indicates activation of the one-way clutch. The reference numerals 2A, 3R, and 4A arranged in a row below the reference numeral B/B indicate a second speed apply chamber 2A, a third speed release chamber 3R and a fourth speed apply chamber 4A of a hydraulic pressure operated servomotor for tightening the band brake B/B. The reference sign o indicates supply of hydraulic fluid pressure to a particular chamber. The reference characters $\alpha_1$ (alpha one) and $\alpha_2$ (alpha two) express a ratio of number of teeth of the sun gear $S_1$ to number of teeth of the ring gear $R_1$, and a ratio of number of teeth of the sun gear $S_2$ to number of teeth of the ring gear $R_2$, respectively. A gear ratio is a ratio of rotational speed of the input shaft 26 to rotational speed of the output shaft 30.

Owing to the change speed operation by the planetary gear box 14, rotating the input shaft 26 at a rotational speed causes the output shaft 30 to rotate at a rotational speed decreased or increased from the rotational speed of the input shaft 26. Torque of the output shaft 30 is transmitted via an output gear 32, idler gear 34, reduction gear 36 to the ring gear 38 of the differential unit 16. This causes the drive axles 40 and 42 to drive the left and right front wheels 40 and 42. As a result, an automatic shift among four forward speed ratios including an overdrive can be effected.

Figure 4:
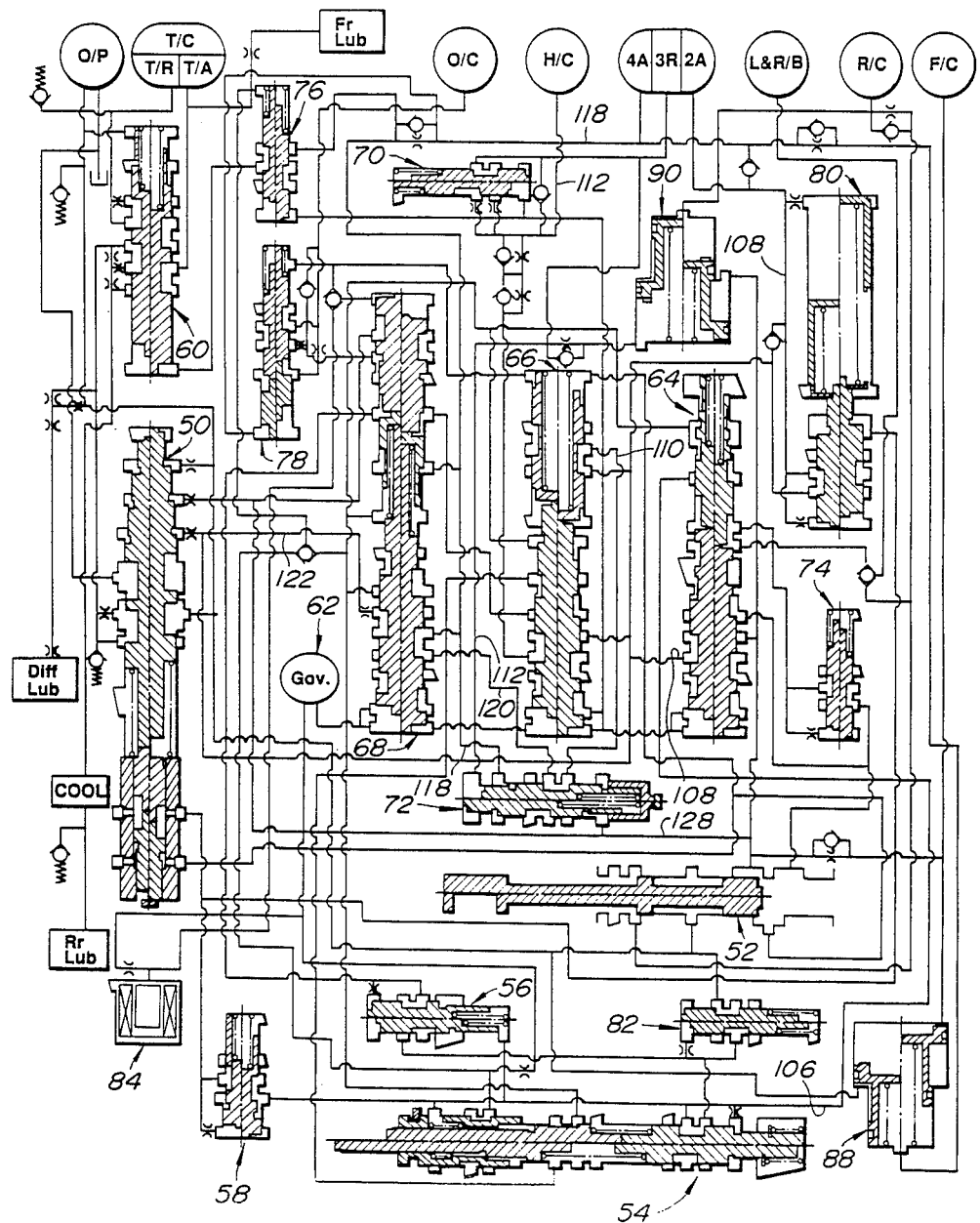
FIG. 4 is a hydraulic circuit of the hydraulic control system for the automatic transmission.

FIG. 4 shows a hydraulic circuit of a hydraulic control system for controlling the above-mentioned power train.

This hydraulic control system comprises the following valves: a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a manual first range pressure reduction valve 74, a vehicle speed cutoff valve 76, an overrun clutch control valve 78, a 1-2 accumulator valve 80, a kickdown modifier valve 82, an overdrive inhibitor solenoid 84, a N-D accumulator 88, and a servo release accumulator 90. These valve are operatively interconnected as illustrated in FIG. 4. They are connected alo to an oil pump O/P, the apply chamber T/A and the release chamber T/R of the torque converter 12, the clutches R/C. H/C, O/C, and F/C, the brake L&R/B, and three chambers 2A, 3R, and 4A of the band brake B/B as illustrated in FIG. 4. Owing to this circuit structure, the appropriate one or the appropriate combination of the clutches R/C, H/C, O/C, and F/C, and the brakes L&R/B and B/B which are to be engaged is selected in response to vehicle speed and opening degree of the engine throttle. In this disclosure, such valves which are not directly concerned with the present invention are not specifically described. The following explanation proceeds along FIG. 1 which illustrates such valves and portions, extracted from the whole system, which have close connection with the present invention in order to make it easy to understand the present invention.

Figure 1:
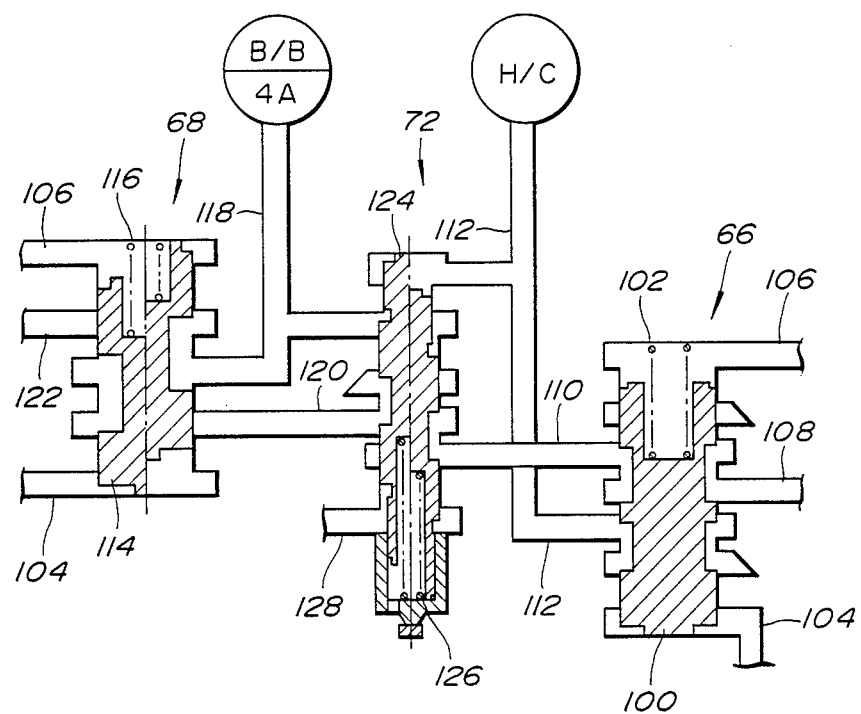
FIG. 1 is a hydraulic circuit diagram of a portion of a hydraulic control system for an automatic transmission showing a preferred embodiment according to the present invention.

Referring to FIG. 1, there are shown the 2-3 shift valve 66, 3-4 shift valve 68, and 4-2 sequence valve 72. In FIG. 1, the 2-3 shift valve 66 and 3-4 shift valve 68 are diagrammatically illustrated in a simplified manner without thoese portions which are not necessary in understanding the operation of this embodiment. Thus, they do not correspond exactly to their counterparts in FIG. 4. However, the basic function is common to them.

As shown in FIG. 1, the 2-3 shift valve 66 comprises a spool 100 and a spring 102. The spool 100 is shiftable between a down position thereof as illustrated in FIG. 1 and an up position thereof in response to a governor pressure supplied thereto from a hydraulic line 104 and a throttle pressure supplied thereto from a hydraulic line 106. In the down position of the spool 100, a first hydraulic line 100 is allowed to communicate with a hydraulic line 108, and a second hydraulic line 112 is drained. The hydraulic line 108 is supplied with a hydraulic fluid under line pressure from the 1-2 shift valve 64 (see FIG. 4). The hydraulic fluid in this hydraulic line 108 is supplied to the second speed apply chamber 2A of the band servo B/B via the 1-2 accumulator valve 80 as shown in FIG. 4. In the up position of the spool 100, the hydraulic line 110 is drained and the hydraulic line 112 is allowed to communicate with the hydraulic line 108. The hydraulic line 112 is connected to the high clutch H/C.

The 3-4 shift valve 68 comprises a spool 114 and a spring 116. The spool 114 is shiftable, in response to a partial throttle pressure supplied thereto from a hydraulic line 106A and the governor pressure supplied thereto from the hydraulic line 104, between a down position and an up position. The partial throttle pressure is a throttle related pressure. In the down position of the spool 114, a third hydraulic line 118 is allowed to communicate with a fourth hydraulic line 120, while in the up position of the spool 114, the hydraulic line 118 is allowed to communicate with a hydraulic line 122 which is supplied with hydraulic fluid under line pressure. The third hydraulic line 118 is connected to the fourth speed apply chamber 4A of the band brake B/B.

The 4-2 sequence valve 72 comprises a spool 124 and a spring 126. The spool 124 is shiftable between a first position as indicated by the left half thereof as illustrated in FIG. 1 and a second position as indicated by the right half thereof as illustrated in FIG. 1. In the first position of the spool 124, the fourth hydraulic line 120 is drained, while in the second position of the spool 124, the hydraulic line 120 is allowed to communicate with the hydraulic line 110. The spool 124 is biased to the first position thereof by a force of the spring 126 and a force due to the line pressure delivered by a hydraulic line 128. The hydraulic pressure in the hydraulic line 112 and the hydraulic pressure in the hydraulic line 118 act on the spool 124 against the spring 126, urging the spool 124 toward the second position thereof.

From the preceding description, it is readily noted to those skilled in the art that when the spool 124 is in the first position thereof, the hydraulic line 120 is drained, thus defining a drain circuit of the 3-4 shift valve 68.

The operation of this embodiment is described.

During operation with the second speed ratio, the spools 100 and 114 of the 2-3 shift valve 66 and 3-4 shift valve 68 are in their down positions, respectively, while the spool 124 of the 4-2 sequence valve 72 is in the first position thereof. Therefore, no hydraulic pressure is supplied to act on the high clutch H/C, and no hydraulic pressure is supplied to act in the fourth speed apply chamber 4A. Since the spool 100 is in the down position, the hydraulic fluid is supplied to the hydraulic line 110, but no hydraulic fluid pressure appears in the hydraulic line 120 since the spool 124 is in the first position.

During operation with the third speed ratio, the spool 100 of the 2-3 shift valve 66 takes the up position thereof although the spool 114 of the 3-4 shift valve 68 stays in the down position thereof. In this state, the hydraulic line 110 is drained, while the hydraulic fluid in the hydraulic line 108 is supplied to the hydraulic line 112 to cause a hydraulic fluid pressure build-up acting on the high clutch H/C. The hydraulic pressure in the hydraulic line 112 acts on the spool 124 of the 4-2 sequence valve 126 to urge the spool 124 to take the second position.

During operation with the fourth speed ratio, the spool 114 of the 3-4 shift valve 68 takes the up position thereof also. Therefore, the hydraulic fluid under line pressure in the hydraulic line 122 is supplied to the hydraulic line 118 and then to the fourth speed apply chamber 4A. The hydraulic pressure in the hydraulic line 118 acts on the spool 124 of the 4-2 sequence valve 72 to urge the spool 124 toward the second position thereof. The spool 124 is held to stay in the second position thereof.

When a 4-2 downshift is commanded, the spool 100 of the 2-3 shift valve 66 and the spool of the 3-4 shift valve 68 are shifted from the up positions to the down positions. Thus, the hydraulic pressure acting on the high clutch H/C drops quickly. However, the hydraulic pressure acting in the fourth speed apply chamber 4A does not drop quickly. When the spool 100 of the 2-3 shift valve 66 takes the down position thereof, the line pressure in the hydraulic line 108 is supplied to the hydraulic line 110 and then to the hydraulic line 120. Therefore, immediately after the spool 114 of the 3-4 shift valve 68 has been shifted to the down position, the hydraulic pressure in the hydraulic line 120 acts in the fourth speed apply chamber 4A via the hydraulic line 118. Thus, even after the spool 114 of the 3-4 shift valve 68 has shifted to the down position thereof, the hydraulic pressure as high as the line pressure keeps on acting in the fourth speed apply chamber 4A, keeping the band brake B/B applied. When the hydraulic pressure in the hydraulic line 112 drops down to a predetermined value, the spool 124 of the 4-2 sequence valve 72 is shifted back to the first position owing to the force of the spring 126 and the force due to the line pressure in the hydraulic line 128. When the spool 124 takes the first position thereof, the hydraulic line 120 is drained, and thus the hydraulic pressure acting in the fourth speed apply chamber 4A drops quickly. As will be readily understood from FIG. 4, the hydraulic pressure in the hydraulic line 112 also acts in the third speed release chamber 3R of the bank brake B/B. Thus, if the hydraulic pressure acting in the fourth speed apply chamber 4A become zero when the hydraulic pressure acting in the servo release chamber 3R is still high enough to release the band brake B/B against the hydraulic pressure acting in the second speed apply chamber 2A, the band brake B/B is released momentarily. Therefore, the above-mentioned predetermined value is set such that the band brake B/B is kept by the hydraulic pressure in the second speed apply chamber 2A even if the hydraulic pressure in the fourth speed apply chamber 4A drops.

It will now be understood that under the control of the single sequence valve 72, the direct downshift from the fourth to the second speed ratio is made in response to a command for a 4-2 downshift.

We claim:

1. In an automatic transmission:
   a first frictional device;
   a second frictional device having a predetermined chamber;
   a first shift valve means having a first hydraulic line and a second hydraulic line, said second hydraulic line being connected to said first frictional device, for supplying hydraulic fluid to one of said first hydraulic line or said second hydraulic line and discharging hydraulic fluid from the other of said first hydraulic line and said second hydraulic line;
   second shift valve means having a third hydraulic line connected to said predetermined chamber of said second frictional device and a fourth hydraulic line, for connecting said third hydraulic line to said fourth hydraulic line;
   sequence valve means connected to said first hydraulic line and said fourth hydraulic line for normally discharging hydraulic fluid from said fourth hydraulic line and blocking said first hydraulic line, said sequence valve means including spool means responsive to hydraulic pressure in said second hydraulic line and hydraulic pressure in said third hydraulic line for connecting said fourth hydraulic line to said first hydraulic line to allow a supply of hydraulic fluid from said first hydraulic line to said fourth hydraulic line.

2. An automatic transmission as claimed in claim 1, wherein said second shift valve means is shiftable between an up position and a down position, and said second shift valve means connects said third hydraulic line to said fourth hydraulic line when said second shift valve means is shifted to said down position thereof.

3. An automatic transmission as claimed in claim 1, wherein said second frictional device has a second chamber which is connected to said second hydraulic line.

4. In an automatic transmission:
   a first frictional device which is subject to hydraulic pressure build-up in a n+1th speed ratio and a n+2th speed ratio, where: n is an integer;
   a second frictional device having a predetermined chamber which is not subject to hydraulic pressure build-up in a nth speed ratio and the n+1th speed ratio, but subject to hydraulic pressure build-up in the n+2th speed ratio;
   a first shift valve for controlling a shift between the nth speed ratio and the n+1th speed ratio, said first shift valve having a first hydraulic line and a second hydraulic line connected to said first frictional device;
   a second shift valve for controlling a shift between the n+1th speed ratio and n+2th speed ratio, said second shift valve having a third hydraulic line connected to said predetermined chamber of said second frictional device;
   a sequence valve having a fourth hydraulic line;
   said first shift valve discharging hydraulic fluid from said second hydraulic line and supplying hydraulic fluid under line pressure to said first hydraulic line when it is in a down position thereof,
   said first shift valve supplying hydraulic fluid under line pressure to said second hydraulic line and discharging hydraulic fluid from said first hydraulic line when it is in an up position thereof;
   said second shift valve allowing communication of said third hydraulic line with said fourth hydraulic line when it is in a down position thereof,
   said second shift valve supplying hydraulic fluid under line pressure to said third hydraulic line when it is in an up position;
   said sequence valve having a spool which is movable between a first position where said spool blocks said first hydraulic line and draining said fourth hydraulic line, and a second position where said spool allows fluid communication of said first hydraulic line with said fourth hydraulic line,
   means for biasing said spool of said sequence valve toward said first position thereof;
   said spool of said sequence valve being urged toward said second position thereof by hydraulic pressures in said second hydraulic line and in said third hydraulic line,
   said spool of said sequence valve taking said second position thereof until the hydraulic pressure in said second hydraulic line drops to a predetermined value when the hydraulic pressure stays in said third hydraulic line.

5. An automatic transmission as claimed in claim 4, wherein said biasing means include a spring and a hydraulic pressure acting on said spool of said sequence valve.

6. An automatic transmission as claimed in claim 4, wherein said spool of said sequence valve has a first pressure acting area which is subject to hydraulic fluid pressure in said second hydraulic line and a second pressure acting area which is subject to hydraulic fluid pressure in said third hydraulic line.

7. An automatic transmission as claimed in claim 6, wherein said biasing means include a spring, and said spool of said sequence valve having a third pressure acting area which is subject to a predetermined hydraulic pressure.

8. An automatic transmission comprising a first frictional device;
   a second frictional device having a predetermined chamber;
   a first shift valve having a first hydraulic line and a second hydraulic line, said second hydraulic line being connected to said first frictional device, said first shift valve having a first position where supply of hydraulic fluid to said first hydraulic line is allowed and discharge of hydraulic fluid from said second hydraulic line is allowed, said first shift valve having a second position where discharge of hydraulic fluid from said first hydraulic line is allowed and supply of hydraulic fluid to said second hydraulic line is allowed;
   a second shift valve having a third hydraulic line connected to said predetermined chamber of said second frictional device and a fourth hydraulic line; and
   a sequence valve connected to said first hydraulic line and said fourth hydraulic line;
   said second shift valve having a first position where supply of hydraulic fluid from said fourth hydraulic line to said third hydraulic line is allowed, said second shift valve having a second position where discharge of hydraulic fluid from said third hydraulic line is allowed;

said sequence valve including a spool moveable between a first position where discharge of hydraulic fluid from said fourth hydraulic line is allowed and a second position where supply of hydraulic fluid from said first hydraulic line to said fourth hydraulic line is allowed, said sequence valve including a spring biasing said spool toward said first position thereof, said spool of said sequence valve having a first pressure acting area which is subject to hydraulic pressure in said second hydraulic line and a second pressure acting area which is subject to hydraulic pressure in said third hydraulic line, said spool of said sequence valve being urged toward said second position against said spring in response to the hydraulic pressures in said second and third hydraulic lines.

9. An automatic transmission comprising means for generating a signal hydraulic pressure, said means for generating including:
   a first frictional device;
   a second frictional device having a predetermined chamber;
   a first shift valve having a first hydraulic line and a second hydraulic line, said second hydraulic line being connected to said first frictional device, said first shift valve having a first position where supply of hydraulic fluid to said first hydraulic line is allowed and discharge of hydraulic fluid from said second hydraulic line is allowed, said first shift valve having a second position where discharge of hydraulic fluid from said first hydraulic line is allowed and supply of hydraulic fluid to said second hydraulic line is allowed;
   a second shift valve having a third hydraulic line connected to said predetermined chamber of said second frictional device and a fourth hydraulic line;
   a sequence valve connected to said first hydraulic line and said fourth hydraulic line;
   said second shift valve having a first position where supply of hydraulic fluid from said fourth hydraulic line to said third hydraulic line is allowed, said second shift valve having a second position where discharge of hydraulic fluid from said third hydraulic line is allowed;
   said sequence valve including a spool moveable between a first position where discharge of hydraulic fluid from said fourth hydraulic line is allowed and a second position where supply of hydraulic fluid from said first hydraulic line to said fourth hydraulic line is allowed, said sequence valve including a spring biasing said spool toward said first position, said spool of said sequence valve having a first pressure acting area which is subject to hydraulic pressure in said second hydraulic line, a second pressure acting area which is subject to hydraulic pressure in said third hydraulic line, and a third pressure acting area which is subject to said signal hydraulic pressure, said spool of said sequence valve being urged toward said second position against said spring in response to the hydraulic pressures in said second and third hydraulic lines, said spool being urged toward said first position thereof.

* * * * *